United States Patent Office 2,913,344
Patented Nov. 17, 1959

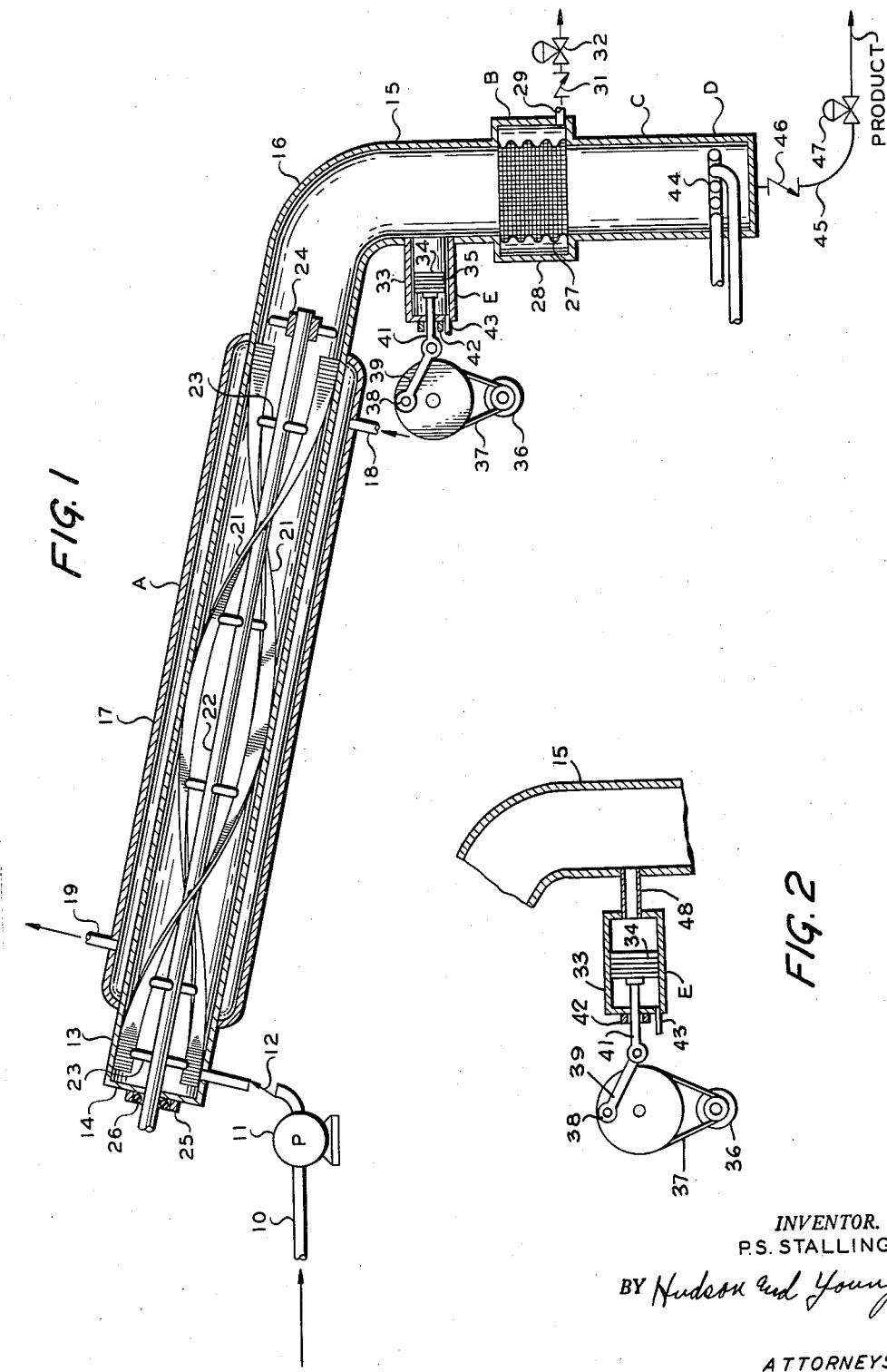
Nov. 17, 1959   P. S. STALLINGS, JR   2,913,344
PROCESS AND APPARATUS FOR PURIFICATION OF CRYSTALS
Filed Nov. 10, 1955
INVENTOR.
P.S. STALLINGS, JR.
BY Hudson and Young
ATTORNEYS

2,913,344

PROCESS AND APPARATUS FOR PURIFICATION OF CRYSTALS

Percy S. Stallings, Jr., Phillips, Tex., assignor to Phillips Petroleum Company, a corporation of Delaware Application November 10, 1955, Serial No. 546,101

8 Claims. (Cl. 99—205)

This invention relates to an improved process for the resolution of mixtures by crystallization and crystal purification; and in one aspect, it relates to an improved apparatus for crystal purification.

Purification by means of fractional crystallization has been known for a number of years. Schmidt Reissue 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product, and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices and other materials which comprise aqueous solutions which can be concentrated by the formation and removal of ice crystals. The process is also of great value in the resolution of non-aqueous mixtures, one example of such an application being the separation of para-xylene from a mixture thereof with the other xylene isomers and ethyl benzene; and another example being the separation of methyl vinylpyridine from mixtures of same with methyl ethylpyridine.

The present invention provides a process and an apparatus for effecting a separation of the type described at higher throughput rates, improved stability and ease of operation, and improved heat distribution. In addition, products of high purity are obtainable over periods of long operation.

It is an object of the present invention to provide an improved process for the purification of crystals. It is a further object of this invention to provide an apparatus for the purification of crystals which is capable of high throughput rates, particularly in the case of purification of crystals which tend to form permeable crystal beds. It is another object to provide an improved process for the purification of crystals by introducing a plurality of pressure waves moving in the direction of the crystal bed movement. It is still another object of this invention to provide a crystal purification apparatus capable of stable operation and high throughput rates with particular respect to the purification of crystals which form permeable crystal beds. Other objects and advantages will be apparent to one skilled in the art upon the study of this disclosure and the accompanying drawing wherein a preferred modification of the invention is illustrated in the form of a sectional elevation of a crystal purification apparatus.

Figure 1 is a sectional elevation of an embodiment of the apparatus of the invention.

Figure 2 is a modification of the pulsation unit of Figure 1.

According to the invention a crystal purification column is operated with improved ease of control and with higher throughput rates by providing a rapidly pulsating pressure wave generated in the column at a point upstream from the filter for removal of mother liquid and preferably between the feed chilling section and said filter. The rapidly pulsating pressure provides a driving force in the direction of crystal bed movement and results in increased stability of operation of the column.

The invention is applicable in a process in which a body of solids is moved by the application of a first force through a liquid removal zone, wherein a liquid is removed, a reflux zone, and a solids melting zone wherein solids are melted, part of the melt being removed from the system, and another part being forced in a direction countercurrent to the direction of the movement of solids in the reflux zone.

Referring now to the drawing the apparatus can be advantageously described as comprising sections designated freezing or crystallizing means A, filtering means B, a reflux zone C, a melting section D and a pulse producing device E, adapted so as to produce a pressure wave in the direction of crystal bed movement.

A feed mixture comprising two or more components, one of which is separable from the mixture by crystallization, enters the apparatus through feed pipe 10 and is forced by means of pump 11 into the chilling section A of the purification apparatus. A check valve 12 is advantageously placed in the feed line between the pump 11 and the chilling section A. The chilling section A comprises a cylindrical shell 13 having a closed end 14 with the other end connected to a crystal purification column 15 by a curved section 16. Although the chilling section and the crystal purification column are shown connected at an angle, indicated by the angular section 16, the chilling section and the purification column can be connected in straight line or at an angle other than that shown in the drawing. A cooling jacket 17 having inlet 18 and outlet 19 encloses the chilling section A. Positioned within the chilling section is an agitating or scraping means 21, which is designed to prevent the accumulation of solid material on the interior surface of cylindrical shell 13. The scrapers 21 are suitably constructed of strips of metal or other suitable materials known in the art and can be fabricated in the form of a helix, as indicated in the drawing, or can be straight. Any suitable number of scrapers 21 can be provided and they are mounted on a rotatable shaft 22 by means of members 23. Shaft 22 is axially positioned in shell 13 by means of bearings 24 and 25 and is connected to any suitable source of power for rotating the scraper, such power source not being shown in the drawing. A suitable packing gland prevents leakage of liquid at bearing 25. The packing gland is indicated at 26 and can be of any desired type known in the art. Sufficient coolant is introduced through inlet 18 and withdrawn from outlet 19 so as to provide sufficient cooling in section A to produce a predetermined amount of solid crystals from the feed material. The resulting crystal mass together with mother liquor passes into crystal purification column 15 and through filter section B.

Filtration section B comprises a suitable filter medium 27 and an external shell 28, the latter being provided with an outlet pipe 29 for removal of filtrate. Filter medium 27 can be of any desired type known in the art. For example, it can comprise a metallic screen, a simple perforate metal member or a perforate metal member supporting a filter cloth. In any event, it is desirable that a filter medium 27 be positioned coextensively with respect to the shell of purification column 15.

Filtrate produced in filter zone B is removed from the system through outlet line 29 advantageously containing check valve 31 and control valve 32.

The pulsation producing member E comprises a cylinder 33 which is suitably attached to the crystal purification column 15 so as to communicate with the interior column 15 at a point upstream from the filter B with respect to crystal flow. A reciprocable piston 34 is sealed in cylinder 33, for example, by means of rings 35 to prevent leakage from column 15 past piston 34. Reciprocation of piston 34 is provided, for example, by an electric motor 36, a belt 37, a crank means 38 and connecting rods 39 and 41. An electric pulsating mechanism can also be employed, if desired. Connecting rod 41 can be sealed in cylinder 33 by means of a packing gland 42. An outlet 43 is provided in cylinder 33 to facilitate reciprocation of piston 34.

The crystal mass which is advanced through filter section B, has most of the mother liquor removed in filtering section B and therefore a crystal mass of increased permeability results as the heater member 44 in melting section D is approached by said crystal mass. The pulsation unit E provides a continuous series of pressure waves traveling in the same direction as the movement of the crystal mass through the reflux section C and the melting section D and thus aids in causing the crystal mass to advance toward the melting section. The heat required for melting a sufficient amount of crystal mass to provide adequate reflux is achieved by means of heater 44. Melted product is withdrawn from melting section D through line 45 which advantageously contains check valve 46 and control valve 47.

While the pulsation unit E is shown as having the cylinder 33 connected directly to the interior of crystal purification column 15 it is also within the scope of this invention to attach cylinder 33 to the interior of the column 15 by means of pipe or conduit 48 which can be connected to the interior column 15 at any desired point between filtration means B and crystal chilling means A as shown in Figure 2. The pulsation unit can be positioned at the curved portion of the column with the piston and cylinder coaxially positioned with respect to the purification column or with the axes parallel. The pulsation unit can be separated from the interior of the purification column by means of a diaphragm positioned in the wall of the column between the interior of cylinder 33 and the interior of the column 15.

The following examples illustrate the invention but are not to be construed as limiting the invention.

EXAMPLE I

Utilizing a 4-inch diameter column similar to that shown in the drawing, a feed stream containing 82.4 mol percent 2-methyl-5-vinylpyridine was processed as reported in the following Table I. The principal impurity of the feed stream was 2-methyl-5-ethylpyridine.

Table I

|  | Run 1 | Run 2 |
| --- | --- | --- |
| Temperatures, ° F.: |  |  |
| Feed | −5 | −5 |
| Mother liquor | −1 | −1 |
| Product | 44 | 28 |
| Pressures, p.s.i.g. (average): |  |  |
| Feed | 160 | 190 |
| Product | 82 | 86 |
| Pulse Unit: |  |  |
| Cycles per minute | 135 | 176 |
| Stroke, inches | 2.4 | 2.4 |
| Piston diameter, inches | 1.5 | 1.5 |
| Rates, gal per hour: |  |  |
| Product | 10.3 | 11.3 |
| Mother liquor | 10.9 | 11.1 |
| Compositions, mol percent MVP: |  |  |
| Feed | 82.4 | 82.4 |
| Mother liquor | 75.8 | 75.8 |
| Product | 90.5 | 92.5 |

EXAMPLE II

Utilizing an 8-inch diameter column similar to that shown in the drawing, a 2-methyl-5-vinylpyridine containing stream was processed as reported in the following Table II. The principal impurity of the feed stream was 2-methyl-5-ethylpyridine.

Table II

|  | Run 1 | Run 2 |
| --- | --- | --- |
| Composition, mol percent MVP: |  |  |
| Feed | 58.8 | 58.8 |
| Mother liquor | 44.5 | 43.0 |
| Product: |  |  |
| Average | 74 | 81 |
| Peak | 80 | 88 |
| Yield, volume percent of feed | 46.2 | 43.2 |
| Product, g.p.h. | 12 | 9.5 |
| Feed, weight percent solids | 25.7 | 27.5 |

I have found that the frequency of pulsation of the pulse unit can be varied over a wide range of cycles per minute and that a frequency as low as 15 cycles per minute or as high as 200 cycles per minute can be advantageously utilized. A preferred range is 50 to 180 cycles per minute and a more preferred range is from 110 to 175 cycles per minute. I have found that in this preferred range of pulsation frequency the crystal mass is provided with a more positive forward movement through the apparatus and as a result increased stability of operation is achieved and a greater output at a higher product purity is thereby made possible, particularly in the case of purification of methyl vinylpyridine.

The dimensions of the cylinder and piston used to produce the pressure pulsation can vary over a wide range; the essential requirement is believed to be that the volume of the cylinder be sufficient so as to provide a pulse that is sufficient to jar the crystal mass. Stated in another way the liquid displacement provided by the piston and cylinder should be sufficient to provide a surge of liquid in the column of sufficient magnitude to momentarily increase the pressure within the column so that a pressure gradient is produced in the direction of the flow of crystals to cause the crystal mass to be moved, although the movement resulting from each cycle be very small. It has been found, for example, that when a purification column of 4 to 8 inches in diameter is used that a pulse unit cylinder diameter of 1½ inches with a pulse amplitude varying in the range of ½ to 2½ inches provide sufficient jarring or vibration to the crystal mass to achieve the desired result. For a column of 4 to 8 inches in diameter the volume of the pulsation unit cylinder can be in the range of 2 to 25 cubic inches.

It is desirable to control the relative proportions of solid and liquid in the feed which is introduced into the purification column. It is generally desired that this proportion be such that the mixture has sufficient of the properties of a liquid or slurry to allow transfer of the mixture by pumping. On the other hand, it is generally desirable to have sufficient solids present so that the mixture has some apparent compressibility; otherwise, a water-hammer effect is sometimes produced by the action of the means provided to produce a pulsating pressure. The optimum ratio of solids to liquid depends on the particular materials to be separated, on crystal size, and on other factors and can readily be determined in any particular case by routine test. As a general rule, the solids content of the mixture fed from the chiller into the purification column is within the range 20 to 36 weight percent, and preferably 25 to 30 weight percent. However, solids contents outside the stated ranges can be used.

In order to illustrate some of the systems to which the invention is applicable, the following compounds are grouped with respect to their boiling points and freezing points.

| | B.P., °C. | F.P. °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cylcohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3,3,-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-cymene | 176.0 | −73.5 |
| Group H: | | |
| Dimethyl phthalate | 282 | 5.5 |
| Dimethyl isophthalate | ¹124 | 67 |
| Dimethyl terephthalate | 288 | 140.6 |
| Group I: | | |
| Ortho-nitrotoluene | 222.3 | α−10.6 / β−4.1 |
| Meta-nitrotoluene | 231 | 15.5 |
| Para-nitrotoluene | 238 | 51.3 |

¹ 12 mm.

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, and 2,2,4-trimethylpentane, and mixtures of at least two of carbon tetrachloride, chloroform, and acetone. The invention is also applicable to the separation of individual components from a mixture of cymenes.

This invention can also be utilized to purify crude naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from other $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

The invention is also applicable to the concentration of food products. In the preparation of such concentrated foods, the process consists generally of the removal of water, in the form of ice crystals, from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

Variations and modifications are possible within the scope of the disclosure of the invention, the essence of which is an improved process for purification of crystals by providing a rapidly pulsating pressure in the direction of crystal flow in the purification column.

That which is claimed is:

1. In a process in which crystals and adhering mother liquor are continuously passed as a slurry from a chilling zone and an intermediate zone through a liquid removal zone from which mother liquor is removed, a reflux zone and a melting zone in which said crystals are melted, part of the melt being withdrawn from the system and the remainder being refluxed into the reflux zone, the improvement which comprises alternately and rapidly withdrawing slurry from and reintroducing slurry to said intermediate zone thereby subjecting materials in said zones to a rapidly pulsating pressure directed in the direction of the passage of said crystals at a frequency in the range of 15 to 200 cycles per minute.

2. In a process in which crystals and adhering mother liquor are continuously passed as a slurry from a chilling zone and an intermediate zone through a liquid removal zone from which mother liquor is removed, a reflux zone and a melting zone in which crystals are melted, part of the melt being withdrawn from the system and the remainder being refluxed into the reflux zone, the improvement which comprises alternately and rapidly withdrawing slurry from and reintroducing slurry to said intermediate zone thereby subjecting materials in said zones to a rapidly pulsating pressure directed in the direction of the passage of said crystals at a frequency in the range of 50 to 180 cycles per minute.

3. In a process in which crystals and adhering mother liquor are continuously passed as a slurry from a chilling zone and an intermediate zone through a liquid removal zone from which mother liquor is removed, a reflux zone and a melting zone in which said crystals are melted, part of the melt being withdrawn from the system and the remainder being refluxed into the reflux zone, the improvement which comprises alternately and rapidly withdrawing slurry from and reintroducing slurry to said intermediate zone thereby subjecting material in said zones to a rapidly pulsating pressure directed in the direction of the passage of said crystals at a frequency in the range of 110 to 175 cycles per minute.

4. In an apparatus which comprises crystallization means in open communication with a feed inlet in a first end of a purification chamber, rigid filtration means positioned coextensively with the wall of said purification chamber at a point intermediate said crystallization means and a hereinafter referred to melting means, melting means positioned in a second end of said purification chamber, melt withdrawal means connected to said second end of said purification means, means for continuously withdrawing liquid from said filtration means, and means for continuously propelling a slurry comprising a mixture of solids and liquid from said crystallization means through said purification chamber to said melting means, the improvement which comprises positive displacement means positioned at a point upstream from said filtration means and downstream from said feed inlet with respect to flow of solids through said purification chamber for alternately and rapidly withdrawing slurry from and reintroducing slurry to said purification chamber at a point intermediate said crystallization and filter means thereby producing a series of pressure waves in said purification chamber in the direction of movement of solids and liquid within said purification chamber.

5. An apparatus according to claim 4 wherein said means for producing said series of pressure waves comprises a cylinder in open communication with said purification chamber; a reciprocable piston positioned in said cylinder; and means to impart a reciprocating motion to said piston.

6. An apparatus according to claim 5 wherein said cylinder is in open communication with said purification chamber by means of a conduit of smaller diameter than that of said cylinder.

7. A process for purifying crystals by removing adhering mother liquor which comprises continuously introducing a feed slurry comprising a mixture of crystals and mother liquor into an elongated, pressure resistant purification zone comprising a mother liquor removal zone, a reflux zone, and a crystal melting zone; withdrawing mother liquor from said purification zone; alternately withdrawing slurry from and reintroducing slurry to said purification zone at a point intermediate the introduction of the feed and the withdrawal of mother liquor at a frequency in the range of 15 to 200 cycles per minute and in an amount sufficient to jar substantially the entire crystal mass in said purification zone; passing crystals as a contiguous mass through said reflux zone; melting said crystals in said melting zone; withdrawing a portion of the crystal melt as a product of the process; and passing remaining crystal melt to said reflux zone in countercurrent flow relationship to the flow of crystals.

8. A crystal purification apparatus comprising an elongated, substantially unobstructed purification chamber having a feed inlet in one end portion and a product outlet in the other end portion; crystal melting means positioned within the end adjacent said product outlet; liquid pervious, crystal impervious rigid filter means positioned coextensively with the wall of said purification chamber and establishing communication between a region exterior of said purification chamber and a region in the interior of said chamber, said region in the interior of said chamber lying between said feed inlet and said crystal melting means; means for introducing a slurry of crystals and mother liquor to said inlet at a pressure sufficient to move crystals toward said melting means; and positive displacement means communicating with the interior of said purification chamber at a point intermediate said feed inlet and said filter means for alternately withdrawing slurry from and reintroducing slurry to said chamber at a frequency in the range of 15 to 200 cycles per minute.

References Cited in the file of this patent

UNITED STATES PATENTS

| | | |
|---|---|---|
| 2,724,508 | Luther | Nov. 22, 1955 |
| 2,747,001 | Weedman | May 22, 1956 |
| 2,854,494 | Thomas | Sept. 30, 1958 |